(12) United States Patent
Dichiera

(10) Patent No.: US 8,469,645 B2
(45) Date of Patent: Jun. 25, 2013

(54) PNEUMATIC FASTENER FOR METAL STUDS AND RELATED METHOD

(76) Inventor: Lawrence J. Dichiera, Pittsburgh, PA (US)

( * ) Notice: Subject to any disclaimer, the term of this patent is extended or adjusted under 35 U.S.C. 154(b) by 516 days.

(21) Appl. No.: 12/075,899

(22) Filed: Mar. 14, 2008

(65) Prior Publication Data

US 2009/0232620 A1 Sep. 17, 2009

(51) Int. Cl.
*F16B 19/14* (2006.01)
*F16B 15/00* (2006.01)

(52) U.S. Cl.
USPC ........... 411/457; 411/440; 411/470; 411/487; 411/921; 411/922

(58) Field of Classification Search
USPC .............. 411/463, 487, 464, 470, 465, 466, 411/467, 468, 469, 439–441, 451.1–461, 411/477–479, 481, 920–922
See application file for complete search history.

(56) References Cited

U.S. PATENT DOCUMENTS

| | | | |
|---|---|---|---|
| 308,837 A * | 12/1884 | Frost | 411/448 |
| 549,555 A | 11/1895 | White | |
| 863,330 A * | 8/1907 | Stimpson | 411/457 |
| 975,322 A * | 11/1910 | Brady | 411/448 |
| 1,021,664 A * | 3/1912 | Dean | 411/455 |
| 1,099,172 A * | 6/1914 | Fowler | 411/470 |
| 1,100,252 A | 6/1914 | O'Neill | |
| 1,466,533 A * | 8/1923 | Kosienski | 411/470 |
| 2,067,359 A * | 1/1937 | Tumminello | 411/470 |
| 2,155,746 A * | 4/1939 | Williams et al. | 40/669 |
| 2,342,709 A * | 2/1944 | Vatet | 411/448 |
| 2,740,505 A * | 4/1956 | Flora | 52/506.05 |
| 2,745,308 A * | 5/1956 | Gisondi | 411/448 |
| 2,751,052 A * | 6/1956 | Flora | 52/506.05 |
| 3,477,334 A | 11/1969 | Stone | |
| 3,645,163 A * | 2/1972 | Byland | 411/448 |
| 3,874,263 A * | 4/1975 | Barth et al. | 411/474 |
| 3,882,755 A * | 5/1975 | Enstrom | 411/456 |
| 3,969,975 A * | 7/1976 | Krol | 411/456 |
| 3,983,779 A * | 10/1976 | Dimas | 411/447 |
| 4,001,993 A | 1/1977 | Daniels | |
| 4,167,885 A | 9/1979 | Paskert et al. | |
| D284,509 S * | 7/1986 | Johnson | D24/145 |
| D340,284 S * | 10/1993 | Johnson | D24/145 |
| 5,557,898 A | 9/1996 | Dixon | |
| 6,349,514 B1 * | 2/2002 | Adams | 52/155 |
| 6,406,233 B1 | 6/2002 | Shaner | |
| 6,659,700 B1 * | 12/2003 | Farrell et al. | 411/450 |
| 6,719,512 B2 | 4/2004 | O'Banion et al. | |
| 6,866,458 B2 | 3/2005 | Farrell et al. | |
| 7,014,408 B2 | 3/2006 | O'Banion et al. | |
| 7,097,405 B2 | 8/2006 | O'Banion et al. | |
| 2005/0053448 A1* | 3/2005 | Lat et al. | 411/470 |
| 2005/0100427 A1* | 5/2005 | Chang | 411/451.3 |
| 2006/0228192 A1* | 10/2006 | Chang | 411/451.3 |

(Continued)

*Primary Examiner* — Victor Batson
*Assistant Examiner* — Tyler Johnson
(74) *Attorney, Agent, or Firm* — Gary P. Topolosky

(57) ABSTRACT

A pneumatically drivable fastener secures drywall or other construction material to a metal stud. Each fastener comprises a driving head; and a one piece shank component, secured at one end to the driving head. Each shank component has an axial length extending perpendicularly and longitudinally from the driving head and is divided into two or three sections: (a) an optional, solid section closest to the driving head; (b) an intermediate section with grooves that define stud cutting edges; and (c) two or more forked ends opposite the driving head. A method for fastening drywall to a plurality of metal studs is also disclosed.

16 Claims, 4 Drawing Sheets

U.S. PATENT DOCUMENTS

| | | | |
|---|---|---|---|
| 2008/0089760 A1* | 4/2008 | Yao | 411/477 |
| 2008/0131233 A1* | 6/2008 | Yao | 411/456 |
| 2009/0232620 A1* | 9/2009 | Dichiera | 411/456 |
| 2010/0303583 A1* | 12/2010 | Siemers et al. | 411/442 |

* cited by examiner

PNEUMATIC FASTENER FOR METAL STUDS AND RELATED METHOD

BACKGROUND OF THE INVENTION

1. Field of the Invention

This invention relates to nails and other types of fasteners used in residential and commercial building construction. More particularly, the invention relates to a fastener for joining drywall, gypsum or wallboard to metal studs. The invention also has applications for fastening: (a) metal to metal; and (b) wood or other trim boards to the doors, windows and/or floor boards in residential or commercial construction.

2. Description of Related Art

It is generally known to provide a construction nail with one or more barbs along its shank or shaft. See, for example, Dixon U.S. Pat. No. 5,557,898. In Gisondi U.S. Pat. No. 2,745,308, there was disclosed a nail (fastener) concept for shingle and roofing applications. It is sheet metal-derived with a pair of inwardly toothed legs designed to spread apart as seen in FIG. 7 of that reference.

In Farrell et al., U.S. Pat. Nos. 6,659,700 and 6,866,458, several L-shaped fasteners were disclosed for metal-to-metal and drywall joining. Both families of fasteners employed an elongated flat body that attaches to a driving head from only one side of the flat body shank.

There were various configurations of self-locking nails for metal frame fastening in O'Banion et al., U.S. Pat. Nos. 6,719,512, 7,014,408 and 7,097,405. Several of these designs employed exterior barbs along sections of the nail shafts proper. Shaner U.S. Pat. No. 6,406,233 focused on a metal stud anchor with a hinged, stud wedge.

FIG. 7 of Daniels U.S. Pat. No. 4,001,993 showed a square-headed, slanted tip nail head without any split shaft leggings. Exterior barbed, sheet metal nails were the focus of Paskert et al., U.S. Pat. No. 4,167,885. But, those nails are two-sided, bifolds rather than a fully enclosed shank with four exterior faces.

Three older references to barbed nails are mentioned herein. Purposefully barbed, nail shanks were shown in FIG. 5 of Stone U.S. Pat. No. 3,477,334. See also, FIG. 3 of O'Neill U.S. Pat. No. 1,100,252, and the barbed nail at FIG. 2 of White U.S. Pat. No. 549,555.

In residential and commercial construction, there is a great deal of drywall required to prep a room for plastering and/or other finish carpentry work. "Drywalling" can be labor intensive, time consuming and thus relatively expensive. In view of this, efforts are always being made to cut corners and reduce costs in this field of construction.

For years, wood studs (or "2×4's") have been the accepted product for framing a room in most residential constructions. It was the underlayment of choice over which drywall was applied. When drywall is attached to wood studs, it may be possible to use a power or pneumatic gun for more efficient, cost-effective installations.

In today's construction market, however, there are other considerations to take into account. Depending on market price fluctuations, an equal length wood stud can cost twice the amount of its metal stud counterpart. Another disadvantage is the environmental concern with using wood studs. There is a continuing lumber demand and wood framing may unduly promote the deforestation of a country. Finally, wood frame members are subject to termite infestation and may require chemical pretreatments. Therefore, there is a growing economic as well as environmental incentive for using metal instead of wood studs in many residential applications.

In most current commercial constructions, metal studs are being mandated for better inherent strengths and their preferred, non-combustible qualities. Typically, drywall is affixed to metal studs with a plurality of screws. While efficient at holding the wallboard to the metal stud, the application of several screws to the perimeter of each section of drywall becomes quite tedious and time consuming.

After the drywall has been installed, and any subsequent plastering of same has been performed, most residential and commercial room constructions proceed with application of the finishing trim. The various trim members used to finish a room interior typically include casings around doors and windows, baseboard, crown molding, wainscoting and/or chair rails. The wood trim serves an aesthetic purpose as well as a functional purpose. It provides a finished look to the room interior. It also seals the gaps between doors, windows or floors and the adjacent wall.

One method of applying finish trim requires first drilling a hole through the trim, followed by insertion of a finish head screw through the trim, wallboard and metal stud with a drill or electric screw gun. Thereafter, these drilled holes are patched with filler and sanded. An alternate method requires gluing the trim to its predetermined location before shooting smooth shank nails through the trim, wallboard, and metal stud with a pneumatic gun.

What is needed is a rapid, yet efficient method for attaching drywall to a metal stud framed room, regardless of whether it is for residential or commercial occupation. Ideally, such attachment/fastener means should be installed using a typical power, pneumatic device. Most preferably, this method should be easily adapted (using different nail head shapes and/or different nail shank dimensions) for applying wood or other trim products over the outer drywall layers of a room.

What is also needed is a drywall fastener and method for metal studwork that can mechanically adhere the respective studs to the fastener (by localized deformations of the stud) rather than the typical prior art drywall means that perform the reverse operation, i.e., actually adhering each fastener to the drywall and stud.

Other objects and features of the present invention will be obvious to those of skill in the art. It should be noted, however, that the drawings are designed for the purpose of illustration only and not as a definition of the limits of the instant invention, for which reference should be made to the appended claims.

BRIEF SUMMARY OF THE INVENTION

The present invention addresses the aforementioned problems by providing a method that should reduce drywall-to-metal stud labor time and costs. The invention provides a fastener and method that better secures the stud to the fastener. And with minor modification (to the fastener head shape and/or shank dimensions), this same invention may be used to attach wood or other outer trim work to the drywall and metal stud for securely holding all members in place.

Particularly, this invention addresses a pneumatically drivable fastener for securing drywall or other construction material to a metal stud. Each fastener comprises a driving head; and a one piece shank component, secured at one end to the driving head. Each shank component has an axial length extending perpendicularly and longitudinally from the driving head and is divided into three sections: (a) a solid section closest to the driving head; (b) an intermediate section with grooves that define stud cutting edges; and (c) two or more forked ends opposite the driving head. A method for fastening drywall to a plurality of metal studs is also disclosed.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

Further features, objectives and advantages of the present invention will become clearer when referring to the following detailed description of preferred embodiments made with reference to the accompanying drawings in which.

DETAILED DESCRIPTION OF PREFERRED EMBODIMENTS

Figure 1:
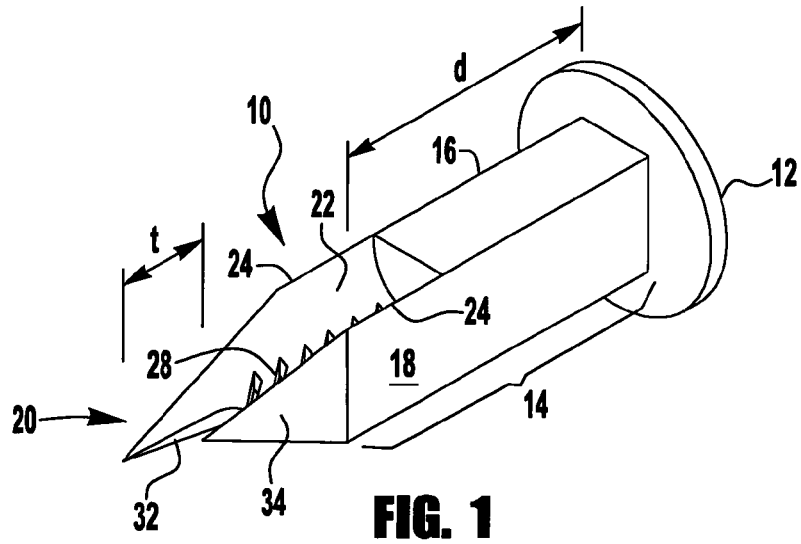
FIG. 1 is a perspective view from the right, front corner illustrating one embodiment of fastener according to this invention.
Figure 2:
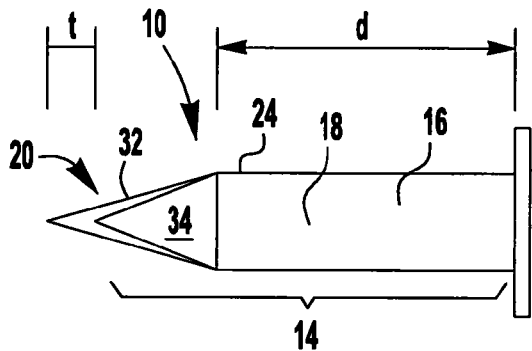
FIG. 2 is a schematic view of the right side of the fastener from FIG. 1, the left side view being similar except for the relative lengths of forked ends to the fastener shank.
Figure 3:
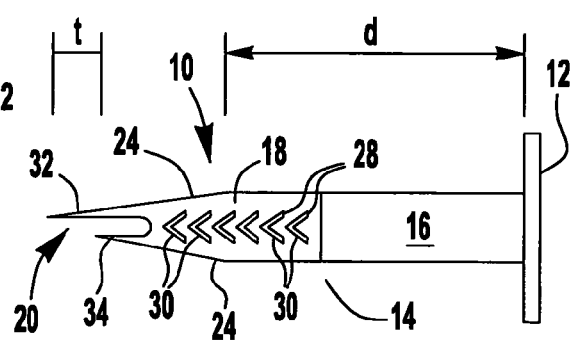
FIG. 3 is a schematic view of the top side of the FIG. 1 fastener, the bottom side view being similar except for the relative lengths of shank forked ends.
Figure 4:
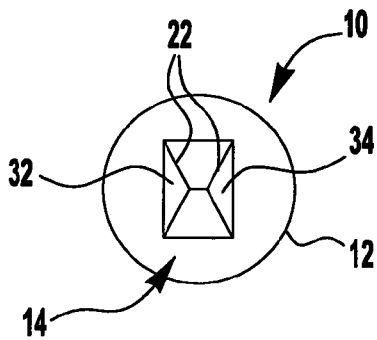
FIG. 4 is a schematic view of the front end of the FIG. 1 fastener looking axially at its forward most points or tips.
Figure 5:
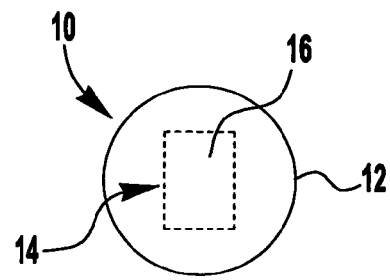
FIG. 5 is a schematic view of the rear, or head, end of the FIG. 1 fastener with the shaft portion (not otherwise visible in this view) indicated with dashed lines.

As used throughout this description, the following definitions shall apply:

a. The term "psi" shall mean pounds per square inch; and b. For every numerical range set forth, it should be noted that all numbers within the range, including every fraction or decimal between its stated minimum and maximum, are considered to be designated and disclosed by this description. As such, herein disclosing a preferred shank/shaft size range of about 0.375 to about 0.75 inch, expressly discloses shaft sizes of 0.38, 0.4 and 0.42 inch . . . and so on, up to about 0.7, 0.72 and 0.74 inch.

Generally speaking, preferred embodiments of this fastener secure drywall board to metal studs, typically made from 18 gauge steel or aluminum. Each fastener preferably includes an enlarged, flat head designed to abut, but not fracture, the wallboard surface when the fastener is installed through same and under stress. It is to be understood, however, that the fasteners of this invention are not limited to just drywall/wallboard applications. By changing the head configuration, they can be used for other construction applications. For instance, a variation with a smaller (round or polygonal) head can be used as a finishing nail for installing trim and/or other molding about a door, window and/or floor baseboard. Also, the shank/shaft section may be greatly reduced, or eliminated altogether. Then, that fastener would be provided with a suitable head to allow for fastening a metal stud to a bottom or header metal channel, i.e., a so-called stud-to-stud connection. This alternative embodiment is discussed in greater detail below with respect to accompanying FIGS. 9 and 10.

The length of shank (or shaft) for most preferred embodiments of fasteners herein should be sufficient to span the most common range of wallboard thicknesses, typically between about ⅜ and ¾ inch. Such a length would enable an anchor section of each fastener to grip the sheared tabs of metal stud which form at one or opposite, fastener gripping ends. It is believed that such sheared tabs form by cutting edges along gripping sections of the fastener shank that begin with the forked fastener ends.

Preferably, each forked end of fastener shank includes two or more spaced apart, metal piercing points. More preferably, these points are offset so that one point will make physical contact with the metal stud before the other. Such contacting initiates the metal piercing and shearing functions of this invention.

In the grooves between the cutting edges, extending upwardly from the forked ends, there are one or more V-shaped indentations. Such indentations facilitate gripping of the fastener to sheared tabs of the metal stud. In one method of manufacturing such fasteners, a solid shank may be subjected to cutting with a saw from opposed faces, i.e. both top and bottom or from both lateral sides, to form the aforementioned V-shaped indentations.

For some applications, the shank of these fasteners may be provided with a coating that exhibits friction-generating properties. One such coating may include a filling with iron filing-based particulates. Those sorts of coatings should further promote gripping between the stud sheared tabs and V-shaped indentations of the fastener.

The fasteners of this invention are designed for pneumatic installation using a typical, powered nail gun. With a fastener configuration that employs piercing and cutting edges, and several V-shaped indentations, this invention should require less power to install through drywall and metal studs than is typically required of other nail gun applications. Such nail guns should easily operate at a lower pressure setting of about 80-100 psi, for example.

Referring now to FIGS. 1 through 5, there is shown a first preferred embodiment of fastener, generally 10, according to this invention. Fastener 10 has a driving head 12 that is depicted as circular and relatively flat. It is understood, however, that other common head shapes may be used herewith. For example, alternate driving head shapes may be oval, square, triangular and/or polygonal. An alternate driving head may be thicker, including dome shaped, dimpled, or possibly textured for better adhesion of spackle coats thereover.

Extending perpendicular to driving head 12 is a one-piece shank component 14 that should have the same general dimensions (both thickness and length) as existing drywall screws and/or finish nails. Shank component 14 is highly distinguishable from prior art drywall fasteners by its being divided into three, non-equal sections, (i) a solid section 16 closest to the driving head 12; an intermediate section 18 and ending in two or more forked ends 20, directly opposite driving head 12.

As shown in the accompanying FIGURES, solid section 16 of shank component 14 is substantially square-shaped in cross-section. It is to be understood, however, that still other cross-sectional shank shapes are possible with the present invention. The main body portions of shank component 14 may be round, triangular or numerous other polygonal shapes. In the accompanying FIGURES, solid section 16 is roughly half the total length of shank component 14. The relative length of solid section 16 is indicated by the distance "d" between adjacent arrows above the fastener 10 in FIGS. 1 through 3. For a typical drywall fastener with a total length of about 1½ to about 2 inches, the relative length for solid section "d" of that fastener should range between about ⅞ inch and about 1¼ inch. Of course, both longer and shorter variations of fasteners are also possible herewith. For instance, when used for some roofing applications, i.e. installing shingles and the like, a longer shank/shaft version would suffice. The overall lengths of such roofing variants may run between about 3 to 3⅓ inches and possibly include a standard washer/button in combination with, or in place of the driving head 12 for same.

Figure 9:
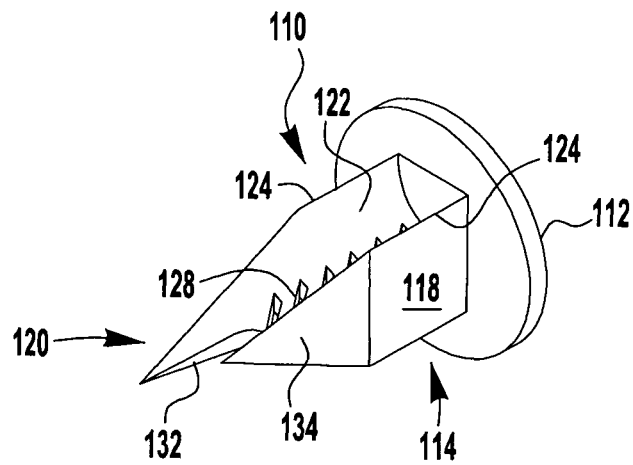
FIG. 9 is a perspective view from the right, front corner illustrating a second embodiment of fastener according to this invention.
Figure 10:
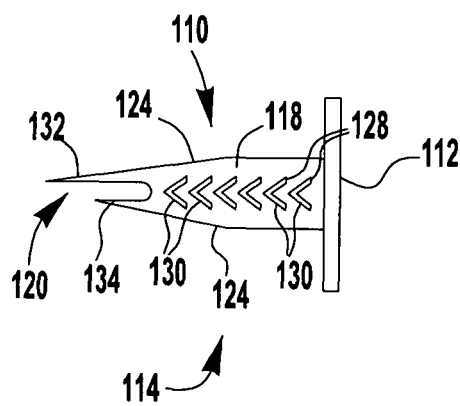
FIG. 10 is a schematic view of the top side of the FIG. 9 fastener, the bottom side view being similar except for the relative lengths of shank forked ends.

In a third alternative embodiment, a representative version of which is depicted in accompanying FIGS. 9 and 10, there is a likelihood of connecting metal stud-to-metal stud components with the pneumatic fasteners of this invention. For those applications, it is not as critical to have an elongated shaft section immediately adjacent driving head 12. In fact, as shown in FIGS. 9 and 10, those alternative embodiments have no equivalent to solid section 16. The overall length of those fastener applications may typically run between about ⅜ inch and about ⁷⁄₁₆ inch. For some types of pneumatic gun firing systems, it may be necessary to include a plurality of these shorter fasteners in a non-interfering, inexpensive adapter strip. One such example may include plastic and/or cardboard inserts.

There is a transition or intermediate section 18 immediately following solid section 16, axially along shank component 14 of fastener 10. Within intermediate section 18, there are at least two grooves 22, the upper, outer edges 24 of said grooves 22 serving as the means for cutting into the metal studs and forming shear tabs therein. These shear tabs (better seen in FIGS. 6-8) are the very means by which the fastener of this invention adheres after passing through the drywall. In the accompanying FIGURES, grooves 22 appear to be saw cut into the top and bottom faces of a four faced, intermediate section 18. The resultant effect is a V-shaped top and bottom anchoring channel along the majority of intermediate section 18. It also gives fastener 10, in a front axial view, somewhat of a bow-tie look as best seen in accompanying FIG. 4.

At a bend of adjoining grooves 22 for intermediate section 18 of fastener 10, there are one or more indentations 28. In the FIGURES, these indentations 28 appear like V-shaped, directional arrowheads. The indentations 28 may be ridged, or recessed. On a preferred basis, V-shaped indentations 28 may include one or more apertures 30 extending completely through the middle of bend to intermediate section 18. These indentations 28 are meant to further enhance how the fastener 10 grips the sheared tabs of a metal stud. They are not intended to serve, in any way, as perforation points for purposefully tearing away and separating the fastener forward end into two or more legged components. In the method of installing drywall with such fasteners, described herein, it is the intent of this invention for the fastener to stay intact.

Furthest from the driving head 12 of fastener 10 is the third section of shank component 14. In the accompanying FIGURES, this third section consists of a pair of outermost tips or forked ends 20. On a preferred basis, the forked ends differ in relative penetration length by a slight degree, indicated by a tip difference "t" indicator in FIGS. 1 through 3. In the accompanying FIGURES, the relative size of tip difference "t" has been exaggerated for illustrative purposes. It may be less than about ⅛ inch to accomplish the preferred penetration aspects of this invention. The end result is a longer forked end 32 and shorter forked end 34. In these FIGURES, there are two separate forked ends shown. It is understood that, depending on the overall shape of shank component 14, there may be more than two forked ends 20 in alternate embodiments.

Figure 6:
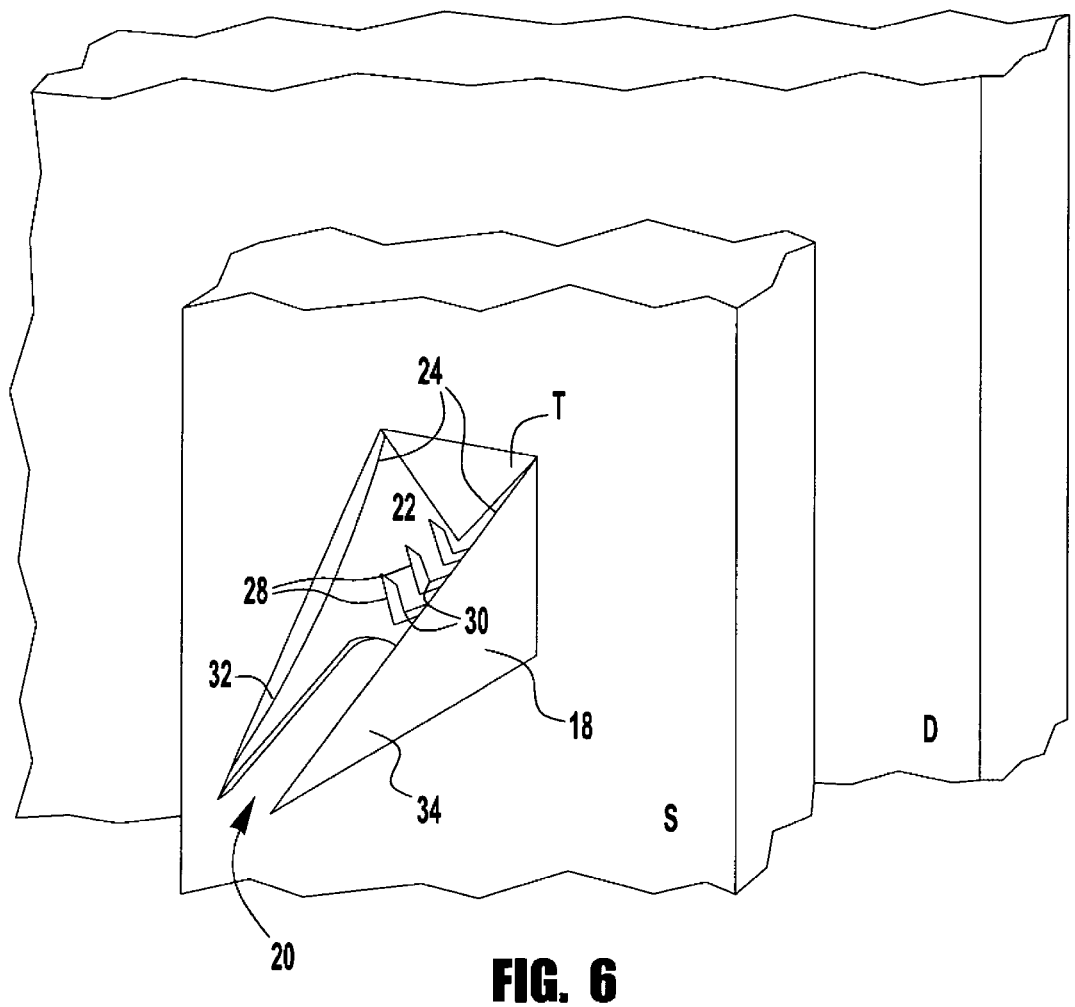
FIG. 6 is a perspective view of one embodiment of fastener according to this invention after its points/tips have been driven through a section of metal stud onto which a section of drywall or wallboard was positioned for attachment.
Figure 7:
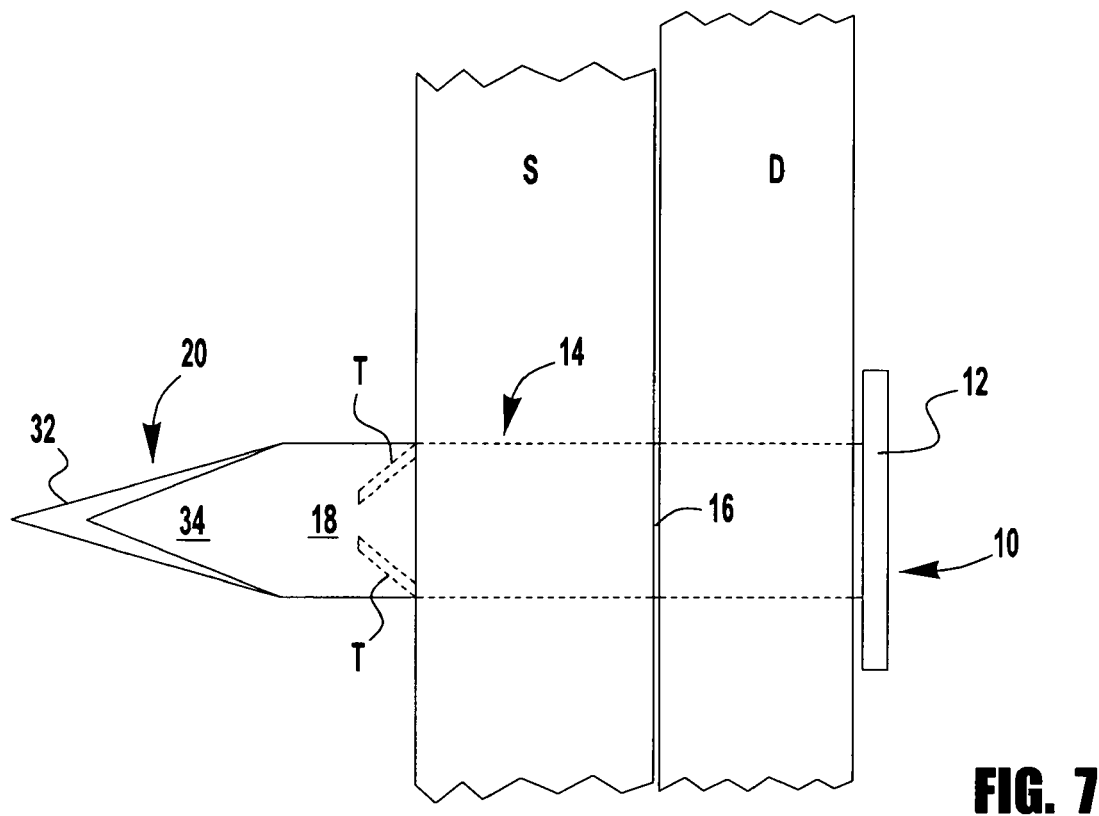
FIG. 7 is a schematic view from the right side of the fastener, drywall and metal stud from FIG. 6, the left side view being similar except for the relative lengths of shank forked ends.
Figure 8:
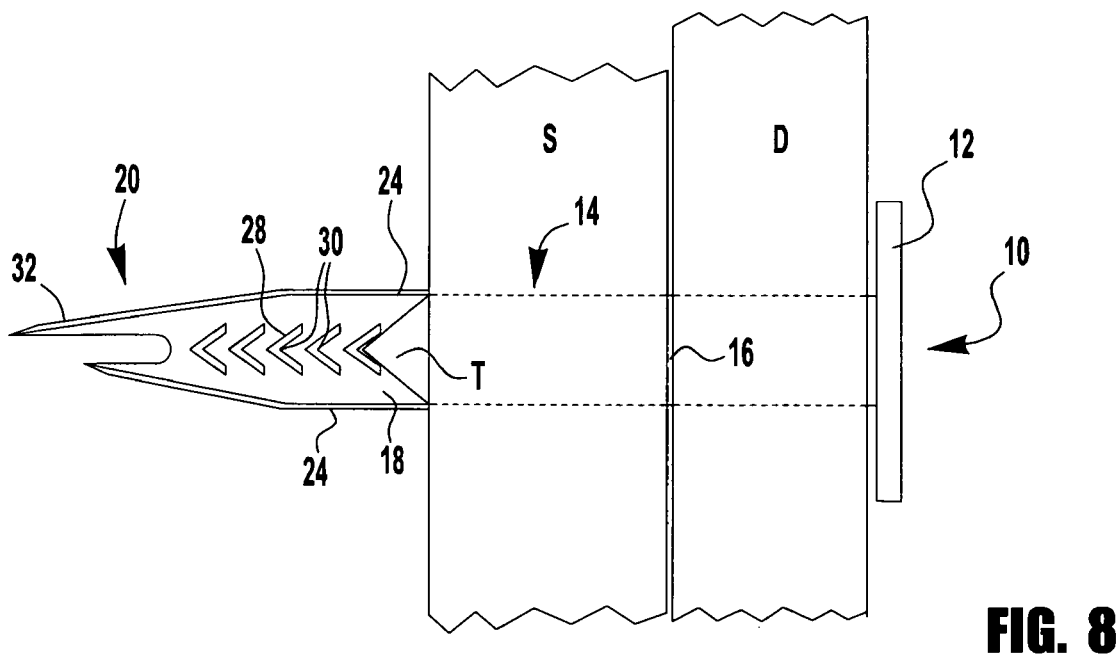
FIG. 8 is a schematic view from the top side of the fastener, drywall and metal stud from FIG. 6, the bottom side view being similar except for the relative lengths of shank forked ends.

FIGS. 6 through 8 disclose the fastener 10 as it passes through a section of drywall D and metal stud S according to preferred embodiments of the methods for using such fasteners. In these FIGURES, common components are commonly numbered with their earlier counterparts from FIGS. 1 through 5. Also in these FIGURES, the gap between drywall D and stud S has been exaggerated. They are typically fastened with one material component directly adjacent the other.

When a standard pneumatic nail gun (not shown) fires a fastener through a section of drywall D duly positioned against a metal stud S, it is important to see how the forked ends 32 and 34 penetrate through the drywall and then metal stud before the outer edges 24 to grooves 22 cause several tabs T to shear or otherwise tear into the inner sides of metal stud S. Unlike prior art fasteners which employ split legs to mechanically adhere A: a fastener, B: TO the stud, this invention focuses on the reverse fastening mechanism. More particularly, through the partial cutting of tabs T into the metal stud interior surface, these cut/sheared tabs interact with the V-shaped, grooved indentations 28 along a properly sized shank component 14 for holding A: the stud, B: to the fastener.

For some applications, it may be appropriate to further enhance that stud tab to fastener interaction by applying a coating to one or more sections of each shank component 14. In still other applications, it may be appropriate to reduce the friction of the outermost forked ends. One means for accomplishing the latter effect would be to dip the outermost tips of each forked end in Teflon ® or another known product coating.

This combination of fastener and method should speed up the overall installation of drywall product onto metal framed stud structures. In fact, by comparison with known applications using multiple screw inserts along the drywall perimeter, usually every 12 inches along each side and intermediate stud connection point (typically vertical) and every 16 inches along each drywall top and bottom edge (typically horizontal), the fasteners of this invention results in an 8 to 10 times savings per standard 4'×8' drywall sheet installed therewith.

Referring now to FIGS. 9 and 10, there is shown a second, alternative embodiment of fastener according to this invention. Particularly, this embodiment addresses a stud-to-stud type fastener. In these two FIGURES, common components are commonly numbered with their earlier counterparts from FIGS. 1 through 8, except in the next hundred series of numbers, namely, the fastener 10 of FIGS. 1-8, is numbered 110 in FIGS. 9 and 10. More particularly, this metal-to-metal fastener, element 110, has a driving head 112 attached to one end of its own shank component 114. Unlike the first embodiment, this alternative product has a relatively shorter shank or shaft as it has no equivalent to earlier solid section 16. Instead, shank component 114 proceeds to an "intermediate" section 118 before terminating in a pair of forked ends 120.

Like the first embodiment, the shank component 114 of this second embodiment still includes grooves 122, with respective outer edges 124. A series of V-shaped indentations 128 extend along the center point of each groove 122. They may, in fact, further define a plurality of apertures 130. And, in the more preferred version depicted, the forked ends 120 actually consist of a longer end 132 and shorter end 134, though it is to be understood that a metal-to-metal type fastener 110 may just as easily support forked ends that are substantially equally protruding (not shown).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In combination with a section of construction material and a metal stud, a pneumatically drivable fastener for securing the section of construction material to the metal stud, said fastener comprising:
    a driving head; and
    a one piece shank component that does not substantially change shape when pneumatically driven for interacting with the section of construction material and the metal stud, said shank component:
    (i) being secured at one end to the driving head;
    (ii) having an axial length extending perpendicular to and longitudinally from said driving head; and
    (iii) being divided into at least two sections:
        (a) an intermediate section having axially extending grooves on top and bottom faces of the shank, with a plurality of apertures located in the grooves and extending between said top and bottom faces, said grooves having cutting edges at outer sides of both top and bottom faces that cut into the metal stud to form at least one shear tab from the cut metal stud, said shear tab interacting with one of the groove apertures to secure the fastener through and to said metal stud; and
        (b) an end section opposite the driving head that terminates in two or more forked tips separated by an intermediate anchoring channel and having a distance between said forked tips which will not split apart substantially when pneumatically driven into the section of construction material and the metal stud, wherein the intermediate anchoring channel connects with the axially extending grooves and the forked tips connect with the outer cutting edges.

2. In the combination of claim 1, wherein one forked tip of the fastener end section extends further from the driving head than the at least one other forked tip.

3. In the combination of claim 1, wherein the fastener further includes a solid spacer section between the driving head and the intermediate section.

4. In the combination of claim 3, wherein the solid spacer section of the fastener is about half the total length of the shank component.

5. In the combination of claim 1, wherein the fastener grooves include multiple apertures near a center axis of the shank component.

6. In the combination of claim 5, wherein the apertures in the fastener grooves are substantially V-shaped.

7. In the combination of claim 1, wherein the section of construction material is selected from the group consisting of: a metal stud, drywall and finishing trim.

8. In combination with a section of drywall and a metal stud, a pneumatically drivable fastener for securing the section of drywall to the metal stud, said fastener comprising:
    a driving head; and
    a one piece shank component, secured at one end to the driving head and designed to not change its shape after being pneumatically driven into the section of drywall and the metal stud beneath, said shank component having an axial length extending perpendicular to and longitudinally from said driving head, said shank component being divided into three sections:
    (a) a solid spacer section closest to the driving head;
    (b) an intermediate section having axially extending grooves on top and bottom faces of the shank, each groove having cutting edges at outer sides of the shank that cut into the metal stud and form one or more shear tabs from the cut metal stud, said intermediate section also having a plurality of spaced apertures located in the grooves and extending between said top and bottom faces for interacting with said stud shear tabs and securing the fastener to and through said metal stud; and
    (c) an end section opposite the driving head, said end section terminating in two or more forked tips for piercing the metal stud when the fastener is pneumatically driven into same, said forked tips separated by an intermediate anchoring channel and having a distance between said forked tips which will not substantially change when pneumatically driven, wherein the intermediate anchoring channel connects with the axially extending grooves and the forked tips connect with the outer cutting edges.

9. In the combination of claim 8, wherein one forked tip of the fastener end section extends further from the driving head than the at least one other forked tip.

10. In the combination of claim 8, wherein the grooves in the intermediate section of the fastener include multiple, spaced apertures near a center axis of the shank component.

11. In the combination of claim 10, wherein the fastener apertures are substantially V-shaped.

12. A method for fastening a section of drywall to a plurality of metal studs comprises:
    (a) loading a pneumatic nail gun with a plurality of fasteners, each fastener comprising:
        a driving head; and
        a one piece shank component secured at one end to the driving head and designed to not change its shape when pneumatically driven into the drywall and metal stud, said shank component having an axial length extending perpendicular to and longitudinally from said driving head,
        said shank component being divided into a solid section closest to the driving head;
        an intermediate section having axially extending grooves on top and bottom faces of the shank, each groove having cutting edges at outer sides of the shank for cutting into the metal stud and forming shear tabs from the cut metal stud, said grooves having a plurality of apertures located in the grooves and extending between said top and bottom faces for interacting with said stud shear tabs to secure the fastener through the section of drywall and to the metal stud; and an end section opposite the driving head that terminates in two or more forked tips which pierce the metal stud, said forked tips:
   (i) being separated by an intermediate anchoring channel;
   (ii) having a distance between the forked tips which will not substantially change when the fastener is pneumatically driven; and
   (iii) staying together when the fastener is pneumatically driven;
wherein the intermediate anchoring channel connects with the axially extending grooves and the forked tips connect with the outer cutting edges;
(b) positioning the loaded nail gun against the section of drywall situated against a series of metal studs; and
(c) firing a plurality of fasteners from the nail gun about a perimeter of the drywall section, through the drywall section and into the metal studs, thereby forming the metal stud shear tabs with which the plurality of apertures interact to secure each fastener.

13. The method of claim 12 which further includes:
(d) firing a plurality of fasteners from the nail gun into the drywall section and a metal stud intermediate the drywall section perimeter.

14. The method of claim 12, wherein each fastener has one forked tip that extends further from the driving head than the at least one other forked tip.

15. The method of claim 12, wherein the grooves in the intermediate section of each fastener include multiple, spaced apertures nearest a central axis of its shank component.

16. The method of claim 15, wherein the groove apertures are substantially V-shaped.

* * * * *